United States Patent
Hartwig et al.

(10) Patent No.: US 10,385,980 B2
(45) Date of Patent: Aug. 20, 2019

(54) VALVE ASSEMBLY WITH TWO SPOOL VALVES

(71) Applicant: ROSS EUROPA GmbH, Langen (DE)

(72) Inventors: Johannes Hartwig, Seeheim-Jugenheim (DE); An Vu Van, Pfungstadt (DE)

(73) Assignee: ROSS EUROPA GMBH (DE)

( * ) Notice: Subject to any disclaimer, the term of this patent is extended or adjusted under 35 U.S.C. 154(b) by 149 days.

(21) Appl. No.: 15/202,650

(22) Filed: Jul. 6, 2016

(65) Prior Publication Data

US 2017/0023138 A1   Jan. 26, 2017

Related U.S. Application Data

(60) Provisional application No. 62/195,400, filed on Jul. 22, 2015.

(51) Int. Cl.
  *F16K 11/07* (2006.01)
  *F16K 31/122* (2006.01)
  (Continued)

(52) U.S. Cl.
  CPC ............ *F16K 11/07* (2013.01); *F15B 11/123* (2013.01); *F15B 13/042* (2013.01); *F15B 13/06* (2013.01);
  (Continued)

(58) Field of Classification Search
  CPC ......... F15B 11/12; F15B 11/125; F15B 11/18; F15B 11/183; F15B 11/22; F15B 13/04; F15B 13/0426; F15B 13/06; F15B 13/0842; F15B 13/07; F15B 13/0814; F15B 2013/0413; F15B 2211/3059; F15B 2211/31588; F15B 2211/782;
  (Continued)

(56) References Cited

U.S. PATENT DOCUMENTS 2,699,757 A * 1/1955 Torokvist ............... F15B 11/125
                                                  33/201
3,106,872 A * 10/1963 Hegg ....................... F15B 11/22
                                                   91/171
(Continued)

FOREIGN PATENT DOCUMENTS

DE   3637345 A1    3/1988
FR   1251751 A  *  1/1961  ............ F15B 11/125
(Continued)

OTHER PUBLICATIONS

International Search Report and Written Opinion for International Application No. PCT/EP2016/066492 dated Jan. 18, 2017.
(Continued)

*Primary Examiner* — Mary E McManmon
*Assistant Examiner* — Richard K. Durden
(74) *Attorney, Agent, or Firm* — Carlson, Gaskey & Olds, P.C.

(57) ABSTRACT

A valve assembly includes a first spool valve that directs fluid to a working object. The first spool valve has 5 ports. A second spool valve directs fluid to the exhaust. The second spool valve has 5 ports. The valve assembly has only 4 positions. The valve assembly can direct the working air through different ports to allow for different working objects to be actuated.

14 Claims, 9 Drawing Sheets

(51) Int. Cl.
*F15B 11/12* (2006.01)
*F16K 27/00* (2006.01)
*F15B 13/042* (2006.01)
*F15B 13/06* (2006.01)
*F15B 13/08* (2006.01)
*F15B 13/04* (2006.01)

(52) U.S. Cl.
CPC .......... *F16K 27/003* (2013.01); *F16K 31/122* (2013.01); *F15B 13/0814* (2013.01); *F15B 2013/0413* (2013.01); *F15B 2211/3059* (2013.01); *F15B 2211/30575* (2013.01); *F15B 2211/329* (2013.01); *F15B 2211/8855* (2013.01)

(58) Field of Classification Search
CPC ..... Y10T 137/86509; Y10T 137/85772; Y10T 137/86807; Y10T 137/86911; Y10T 137/87; Y10T 137/87096; Y10T 137/87193; Y10T 137/87225
USPC ............. 91/167 R, 461; 137/596.14, 596.18, 137/625.12, 625.35, 627, 627.5, 630.17, 137/637, 884
See application file for complete search history.

(56) References Cited

U.S. PATENT DOCUMENTS

| | | | |
|---|---|---|---|
| 3,269,416 A | 8/1966 | Adams | |
| 3,483,891 A * | 12/1969 | Carrieri | F15B 13/0402 137/596.16 |
| 3,603,348 A * | 9/1971 | Wright | F16K 31/426 137/596.16 |
| 3,744,376 A * | 7/1973 | Carpenter | F15B 13/06 137/12 |
| 4,055,281 A * | 10/1977 | Rosen | B65B 3/32 222/309 |
| 4,166,506 A * | 9/1979 | Tezuka | E02F 3/844 172/4.5 |
| 4,254,799 A | 3/1981 | Blatt | |
| 4,296,677 A * | 10/1981 | Little | F15B 15/1466 91/510 |
| 4,359,064 A * | 11/1982 | Kimble | F15B 13/0817 137/269 |
| 4,585,024 A | 4/1986 | Esseniyi | |
| 4,924,902 A | 5/1990 | Lewis et al. | |
| 5,487,527 A * | 1/1996 | Eggleston | F16K 31/1228 251/285 |
| 5,606,993 A | 3/1997 | Stoll | |
| 5,704,399 A * | 1/1998 | Hayashi | F15B 13/0817 137/271 |
| 5,749,395 A * | 5/1998 | Hayashi | F15B 13/0821 137/596.16 |
| 5,887,618 A | 3/1999 | Grundby et al. | |
| 6,041,819 A * | 3/2000 | Walleman | F16K 11/07 137/240 |
| 6,109,291 A | 8/2000 | Yoshimura | |
| 6,408,876 B1 * | 6/2002 | Nishimura | F15B 11/165 137/596.14 |
| 6,904,937 B2 | 6/2005 | Fischer | |
| 7,185,673 B2 * | 3/2007 | Hodges | F15B 20/001 137/596.16 |
| 7,647,940 B2 | 1/2010 | Minervini et al. | |
| 8,297,586 B1 | 10/2012 | Thompson | |
| 8,397,759 B2 | 3/2013 | Oikawa et al. | |
| 2001/0022196 A1 | 9/2001 | Fagerstrom | |
| 2002/0013077 A1 * | 1/2002 | Lepine | F15B 13/0814 439/191 |
| 2011/0220822 A1 * | 9/2011 | Bento | F15B 20/001 251/129.15 |
| 2013/0087729 A1 | 4/2013 | Bento et al. | |
| 2015/0128583 A1 | 5/2015 | Fujiwara | |

FOREIGN PATENT DOCUMENTS

| | | | |
|---|---|---|---|
| GB | 850466 | 10/1960 | |
| GB | 1022816 | 3/1966 | |
| GB | 1443199 A * | 7/1976 | ............... E02F 3/84 |
| WO | 2005/071296 A1 | 8/2005 | |

OTHER PUBLICATIONS

International Preliminary Report on Patentability for International Application No. PCT/EP2016/066492 dated Jun. 20, 2017.

* cited by examiner

VALVE ASSEMBLY WITH TWO SPOOL VALVES

REFERENCE TO RELATED APPLICATIONS

This application claims priority to U.S. Provisional Application No. 62/195,400 filed Jul. 22, 2015.

BACKGROUND OF THE INVENTION

A prior valve assembly includes a solenoid. Air flows through an inlet and then through either an outlet or an exhaust. It is beneficial to control the air flowing through the inlet. Prior valves employ a check valve and steel balls (pneumatic logic elements). However, this can be a complex arrangement.

SUMMARY OF THE INVENTION

In a featured embodiment, a valve assembly includes a first spool valve that directs fluid to a working object. A second spool valve directs fluid to an exhaust.

In another embodiment according to the previous embodiment, the first spool valve includes a first spool valve first port, a first spool valve second port, a first spool valve third port, a first spool valve fourth port, and a first spool valve fifth port. The second spool valve includes a second spool valve first port, a second spool valve second port, a second spool valve third port, a second spool valve fourth port, and a second spool valve fifth port. The first spool valve first port and the second spool valve first port define a port A. The first spool valve second port and the second spool valve second port define a port B. The first spool valve third port and the second spool valve third port define a port C. The first spool valve fourth port and the second spool valve fourth port define a port D. The first spool valve fifth port and the second spool valve fifth port define a port E.

In another embodiment according to any of the previous embodiments, the first spool valve and the second spool valve are actuated simultaneously by a first pneumatic control cylinder and a second pneumatic control cylinder, respectively, and the first pneumatic control cylinder and the second pneumatic control cylinder are each configured to receive a first supply of pilot air and a second supply of pilot air, respectively.

In another embodiment according to any of the previous embodiments, the first pneumatic control cylinder includes a first spool valve wall. A first spool valve first piston is located in a first spool valve first compartment on one side of the first spool valve wall. A first spool valve second piston is located in a first spool valve second compartment on an opposing side of the first spool valve wall. The second pneumatic control cylinder includes a second spool valve wall. A second spool valve first piston is located in a second spool valve first compartment on one side of the second spool valve wall and a second spool valve second piston is located in a second spool valve second compartment on an opposing side of the second spool valve wall.

In another embodiment according to any of the previous embodiments, a first check valve controls a flow from the first supply of pilot air to the first spool valve, and a second check valve controls the flow from the second supply of pilot air to the second spool valve.

In another embodiment according to any of the previous embodiments, the first pneumatic control cylinder and the second pneumatic control cylinder include a first resilient member and a second resilient member, respectively. When the first supply of pilot air and the second supply of pilot air are not being supplied, the first resilient member and the second resilient member return the first pneumatic control cylinder and the second pneumatic control cylinder to a first position.

In another embodiment according to any of the previous embodiments, the valve assembly has 4 positions.

In another embodiment according to any of the previous embodiments, the valve assembly has 5 ports.

In another embodiment according to any of the previous embodiments, when the valve assembly is in a first position, a first supply of pilot air is not supplied to the first compartment of both the first spool and the second spool valve. A second flow of supply air is not supplied to the second compartment of both the first spool valve and the second spool valve.

In another embodiment according to any of the previous embodiments, when the valve assembly is in the first position, air from the port A, the port B, the port C, the port D and the port E flows through the second spool valve and exhausts through a silencer/muffler.

In another embodiment according to any of the previous embodiments, when the valve assembly is in a second position, a first supply of pilot air is supplied to the first compartment of both the first spool valve and the second spool valve. A second supply of pilot air is not supplied to the second compartment of both the first spool valve and the second spool valve. The first pistons are in a second position, and the second pistons are in a first position.

In another embodiment according to any of the previous embodiments, when the valve assembly is in the second position, the first supply of pilot air flows through the first spool valve, the port A, and the port B, and air from the port C, the port D and the port E flows through the second spool valve and exhaust through a silencer/muffler.

In another embodiment according to any of the previous embodiments, when the valve assembly is in a third position, a first supply of pilot air is not supplied to the first compartment of both the first spool valve and the second spool valve. A second supply of pilot air is supplied to the second compartment of both the first spool valve and the second spool valve. The first pistons are in a first position, and the second pistons are in a second position.

In another embodiment according to any of the previous embodiments, when the valve assembly is in the third position, the first supply of pilot air flows through the first spool valve, the port A, the port C, and the port D, and air from the port B and the port E flows through the second spool valve and exhausts through a silencer/muffler.

In another embodiment according to any of the previous embodiments, when the valve assembly is in a fourth position, a first supply of pilot air is supplied to the first compartment of both the first spool valve and the second spool valve. A second supply of pilot air is supplied to the second compartment of both the first spool valve and the second spool valve. The first pistons are in a second position, and the second pistons are in a second position.

In another embodiment according to any of the previous embodiments, when the valve assembly is in the fourth position, the first supply of pilot air and the second supply of pilot air flows through the first spool valve, the port A, the port C, and the port E, and air from the port B and the port D flows through the second spool valve and exhausts through a silencer/muffler.

In another embodiment according to any of the previous embodiments, the first spool valve and the second spool valve are received in a body, and the port A, the port B, the port C, the port D and the port E are formed in the body between the first spool valve and the second spool valve.

BRIEF DESCRIPTION OF THE DRAWINGS

The various features and advantages of the invention will become apparent to those skilled in the art from the following detailed description of the currently preferred embodiment. The drawings that accompanies the detailed description can be briefly described as follows.

DETAILED DESCRIPTION OF PREFERRED EMBODIMENTS

Figure 1:
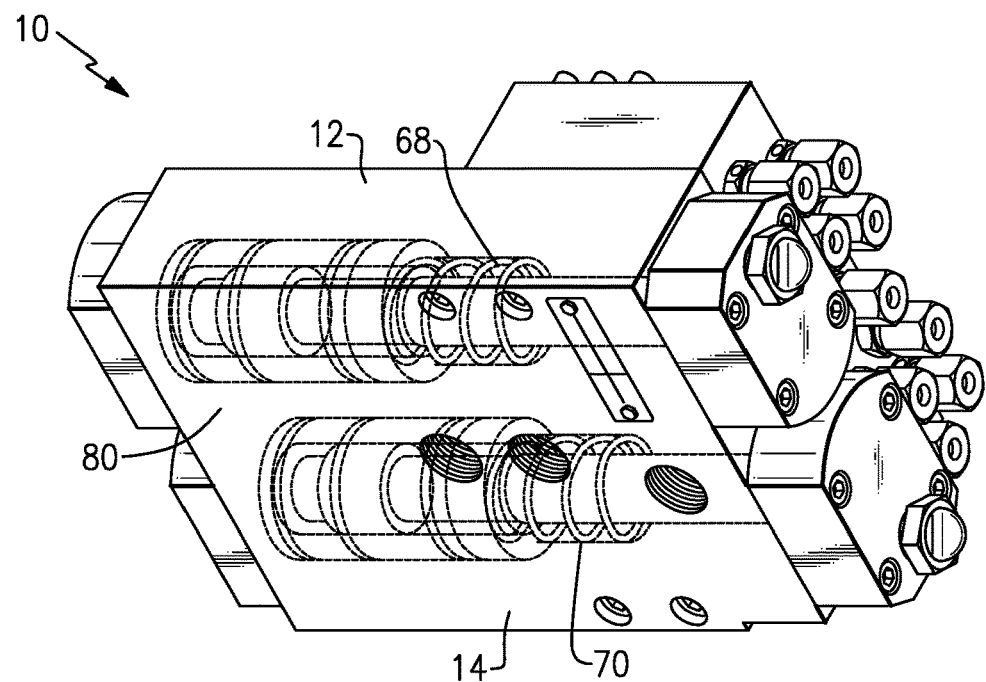
FIG. 1 illustrates a perspective view of a valve assembly.
Figure 2:
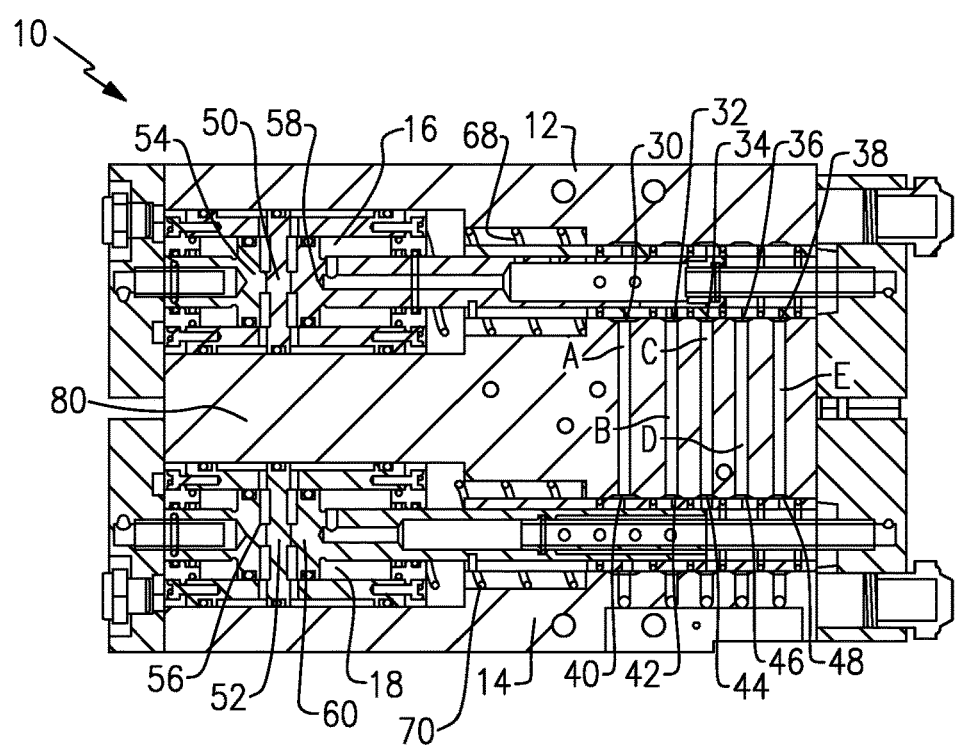
FIG. 2 illustrates a cross-sectional top view of the valve assembly.

FIG. 1 illustrates a perspective view of a valve assembly 10, and FIG. 2 illustrates a cross-sectional top view of the valve assembly 10. The valve assembly 10 includes two spool valves 12 and 14. In one example, the first spool valve 12 functions as a working valve, and the second spool valve 14 functions as an exhaust valve. The first spool valve 12 directs fluid through different ports and to different working objects. In the example described, the valve assembly 10 is a 10/4 valve assembly 10. That is, the valve assembly 10 has 10 ports and 4 positions. However, the valve assembly 10 could have any number of ports. For example, the valve assembly 10 could have 16 ports.

In the example shown, the first spool valve 12 includes ports 30, 32, 34, 36 and 38, and the second spool valve 14 includes ports 40, 42, 44, 46 and 48. Ports 30 and 40 define port A, ports 32 and 42 define port B, ports 34 and 44 define port C, ports 36 and 46 define port D, and ports 38 and 48 define port E.

The first spool valve 12 and the second spool valve 14 are received in a body 80, and the port A, the port B, the port C, the port D and the port E are formed in the body 80 between the first spool valve 12 and the second spool valve 14.

As shown in FIGS. 4, 7, 10 and 13 described below, the first spool valve 12 and the second spool valve 14 are each actuated simultaneously by a first pneumatic control cylinder 16 and a second pneumatic control cylinder 18, respectively, that receives a supply of pilot air S1 and S2, respectively. As shown in the following figures, each of the first pneumatic control cylinder 16 and the second pneumatic control cylinder 18 includes a wall 50 and 52, respectively, with a first piston 54 and 56, respectively, on one side of the wall 50 and 52, respectively and a second piston 58 and 60, respectively, on the opposing side of the wall 50 and 52, respectively.

The first spool valve 12 and the second spool valve 14 each independently have 2 positions. Together, the valve assembly 10 defines 4 positions. A first check valve 64 controls a flow from the first supply of pilot air S1 to the first spool valve 12, and a second check valve 66 controls a flow from the second supply of pilot air S2 to the second spool valve 14.

Figure 3:
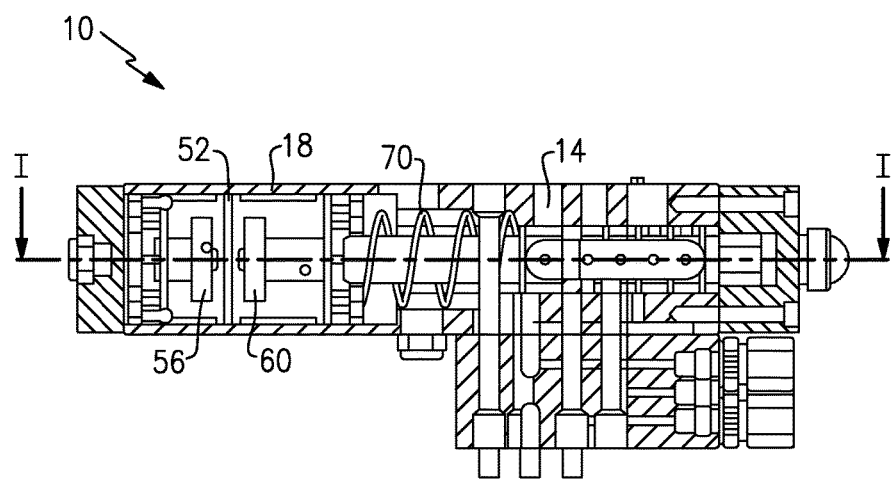
FIG. 3 illustrates a cross-sectional side view of the valve assembly in a first position.
Figure 4:
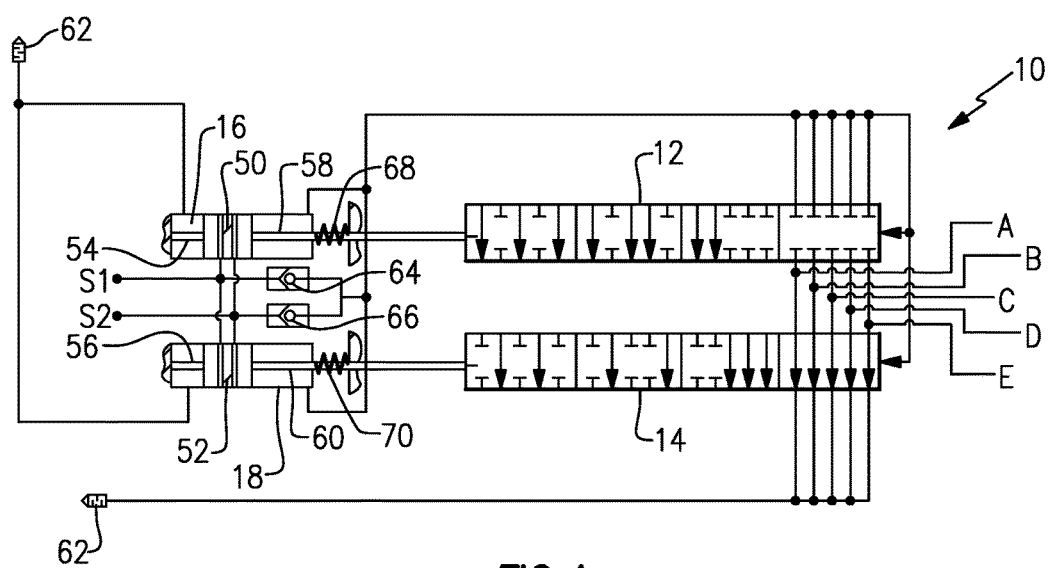
FIG. 4 illustrates a schematic diagram of the valve assembly in the first position.
Figure 5:
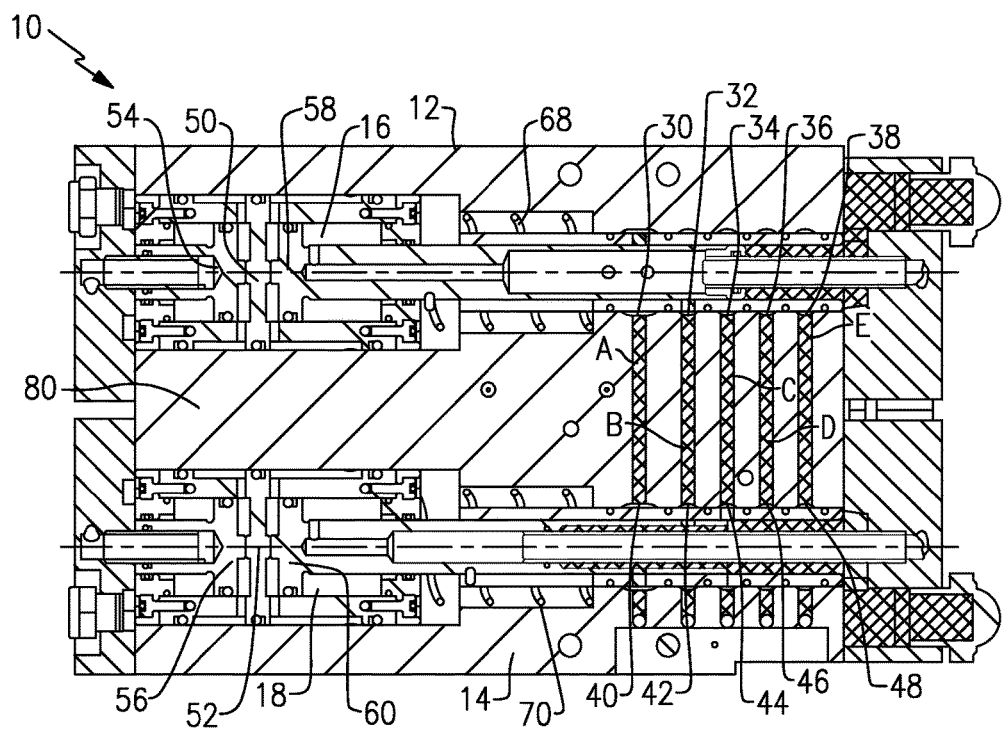
FIG. 5 illustrates a cross-sectional top view of the valve assembly in the first position taken along line I-I of FIG. 3.

FIGS. 3, 4 and 5 illustrate the valve assembly 10 in a first position. In the first position, the stroke is 0 mm. In the first position, pilot air S1 and S2 is not provided to the compartments that contain the first piston 54 and the second piston 58 of the first pneumatic control cylinder 16 and the compartments that contain the first piston 56 and the second piston 60 of the second pneumatic control cylinder 18. That is, there is no pilot air supply from the first flow of pilot air S1 and the second flow of pilot air S2. The first pistons 54 and 56 are in a first position, and the second pistons 58 and 60 are in a first position. As no pilot air S1 and S2 is provided to either the first pneumatic control cylinder 16 or the second pneumatic control cylinder 18, air from the first spool valve 12 (the working valve) and the second spool valve 14 (the exhaust valve) exhausts through ports A, B, C, D and E through the silencer/muffler 62 (the exhaust is shown with intersecting lines).

Figure 6:
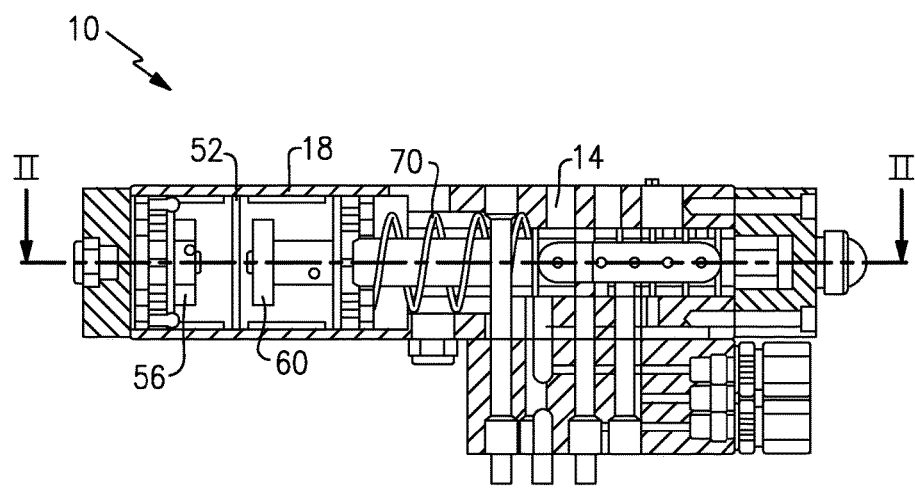
FIG. 6 illustrates a cross-sectional side view of the valve assembly in a second position.
Figure 7:
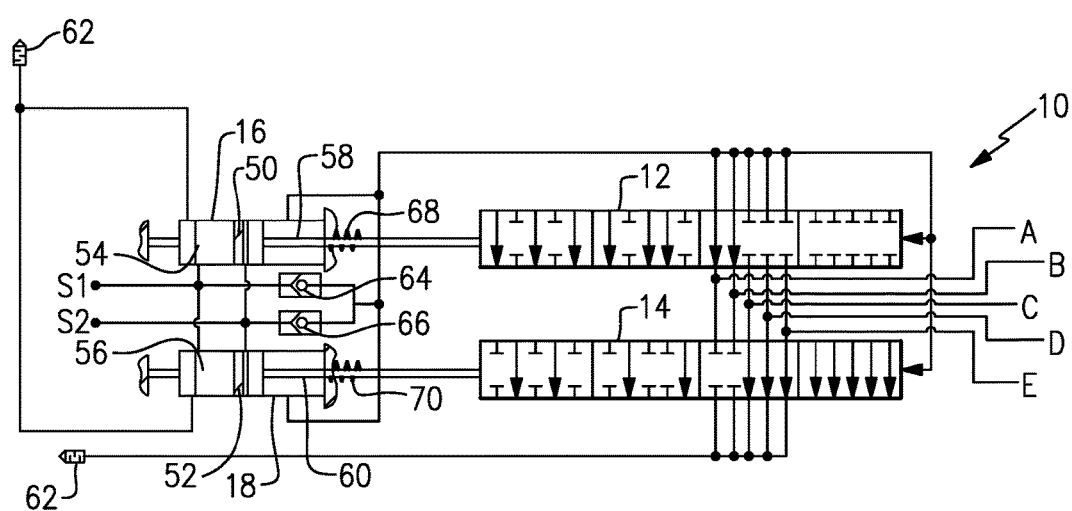
FIG. 7 illustrates a schematic diagram of the valve assembly in the second position.
Figure 8:
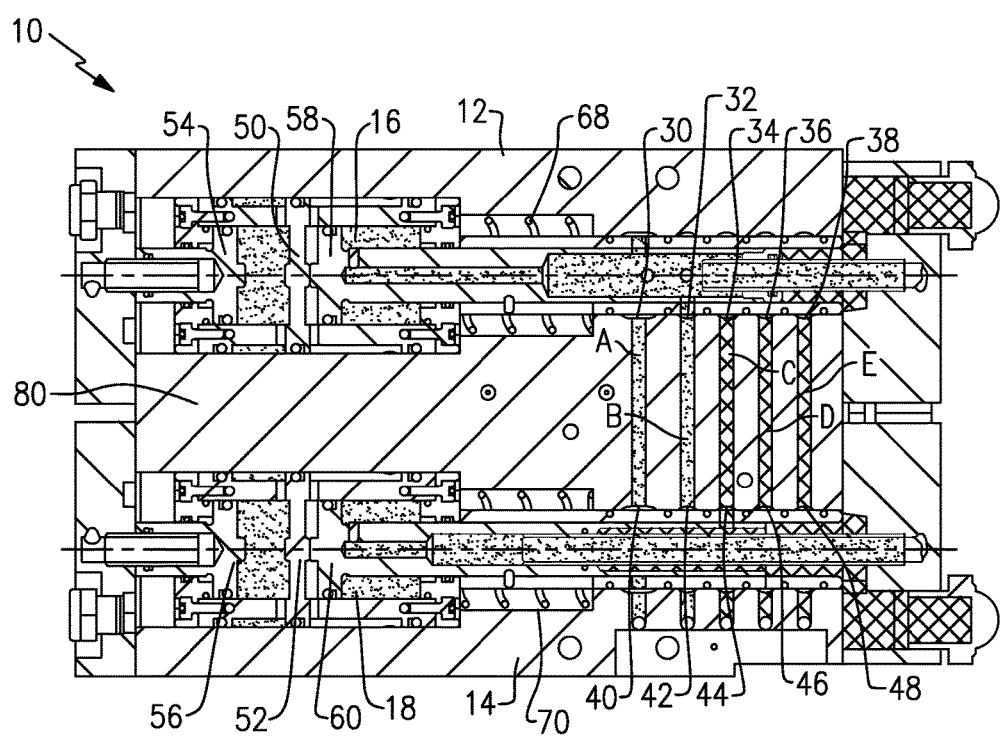
FIG. 8 illustrates a cross-sectional top view of the valve assembly in the second position taken along line II-II of FIG. 6.

FIGS. 6, 7 and 8 illustrate the valve assembly 10 in a second position. In the second position, the stroke is 10 mm. The flow of working air is shown with dotted lines, and the flow of exhausted air is shown as intersecting lines. In the second position, the pilot air S1 is provided to the compartments that contain the first piston 54 of the first pneumatic control cylinder 16 and the first piston 56 of the second pneumatic control cylinder 18, and the pilot air S2 is not provided to the compartments that contain the second piston 58 of the first pneumatic control cylinder 16 and the second piston 60 of the second pneumatic control cylinder 18. In one example, the pressure of the pilot air S1 is 6 bar. The first pistons 54 and 56 are in the second position, and the second pistons 58 and 60 are in the first position. When the valve assembly 10 is the second position, air from the first spool valve 12 and the second spool valve 14 flows to the working ports A and B and exhausts through exhaust ports C, D and E through the silencer/muffler 62.

Figure 9:
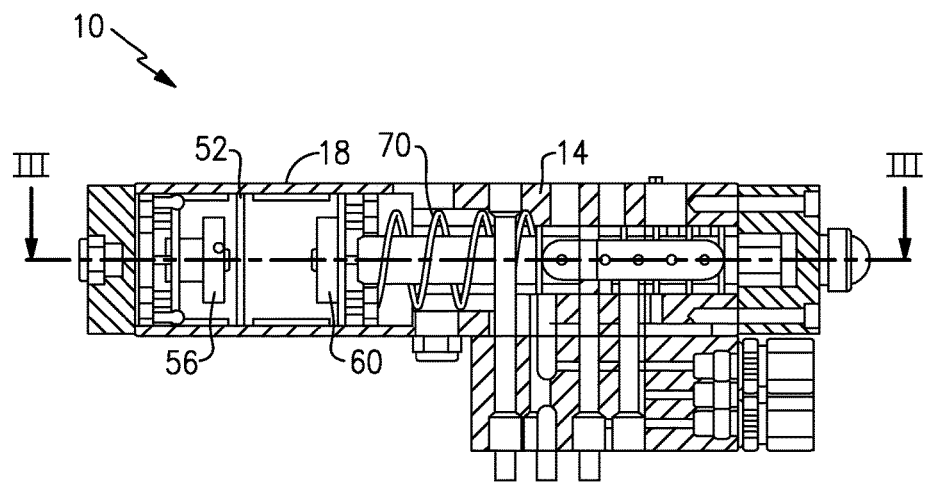
FIG. 9 illustrates a cross-sectional side view of the valve assembly in a third position.
Figure 10:
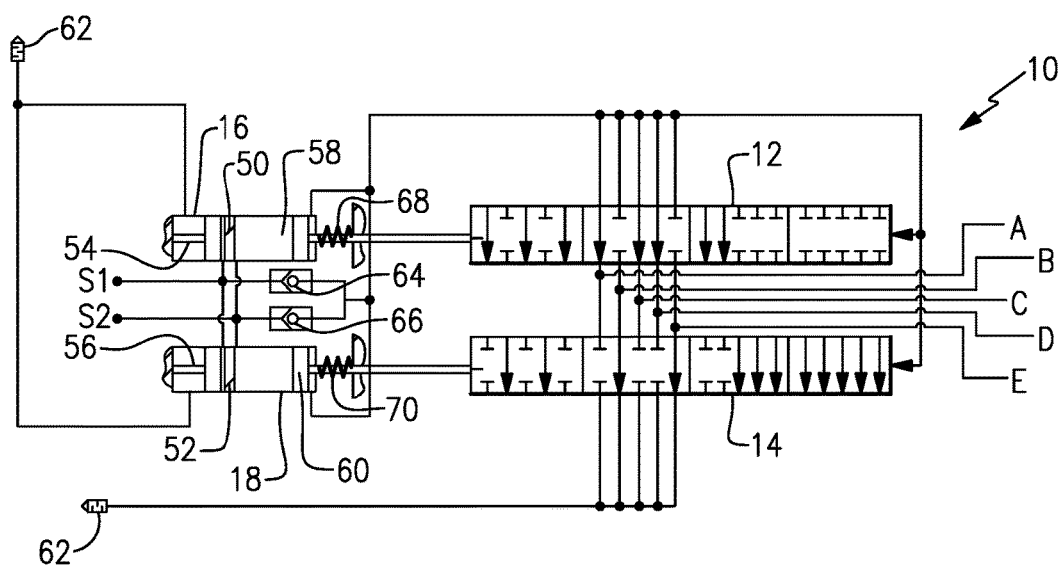
FIG. 10 illustrates a schematic diagram of the valve assembly in the third position.
Figure 11:
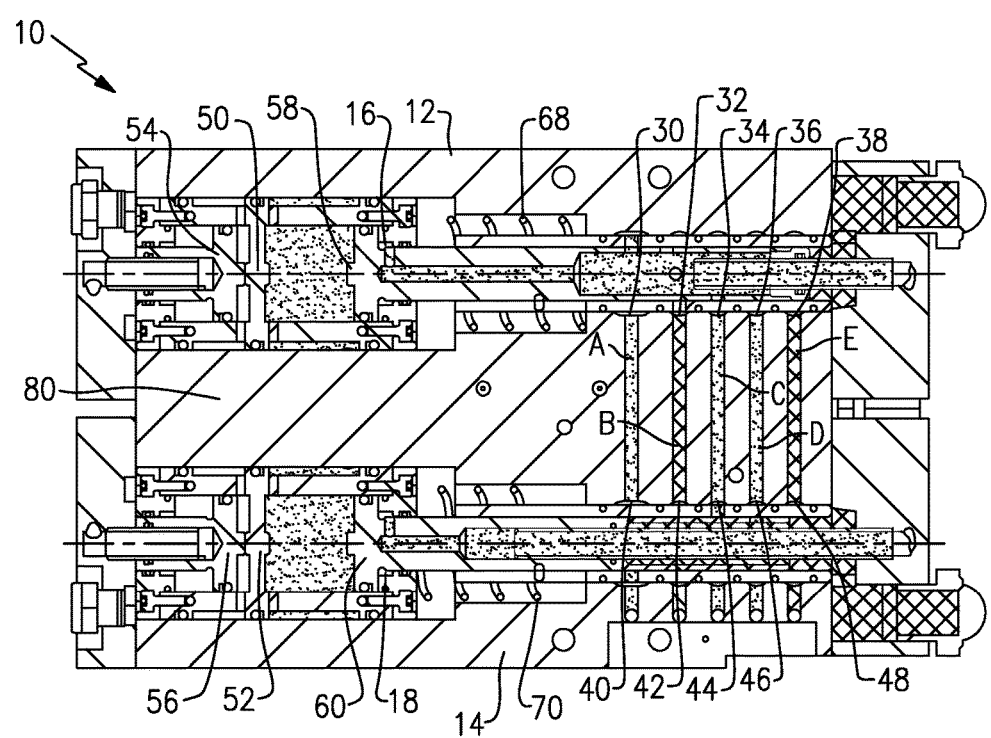
FIG. 11 illustrates a cross-sectional top view of the valve assembly in the third position taken along line III-III of FIG. 9.

FIGS. 9, 10 and 11 illustrate the valve assembly 10 in a third position. In the third position, the stroke is 20 mm. The flow of working air is shown with dotted lines, and the flow of exhausted air is shown as diagonal lines. In the third position, the pilot air S1 is not provided to the compartments that contain the first piston 54 of the first pneumatic control cylinder 16 and the first piston 56 of the second pneumatic control cylinder 18, and the pilot air S2 is provided to the compartments that contain the second piston 58 of the first pneumatic control cylinder 16 and the second piston 60 of the second pneumatic control cylinder 18. In one example, the pressure of the pilot air S2 is 6 bar. The first pistons 54 and 56 are in the first position, and the second pistons 58 and 60 are in the second position. When the valve assembly 10 is the third position, air from the first spool valve 12 and the second spool valve 14 flows to the working ports A, C and D and exhausts through exhaust ports B and E through the silencer/muffler 62.

Figure 12:
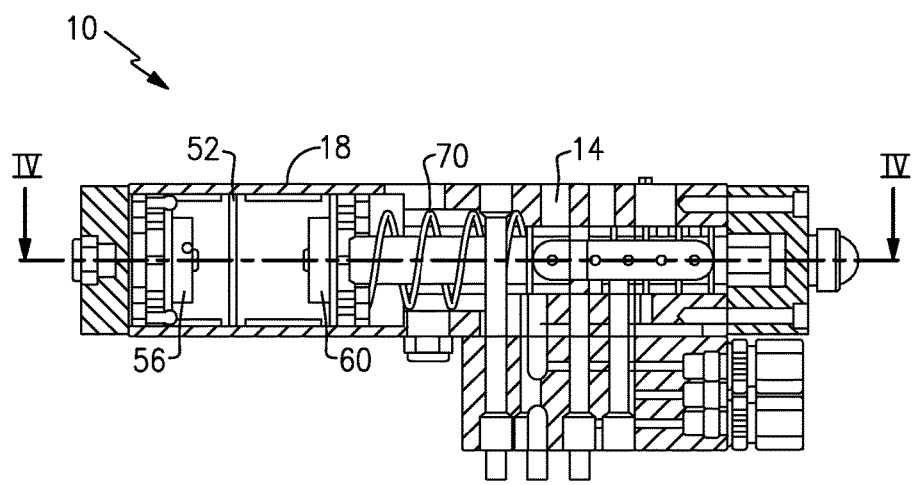
FIG. 12 illustrates a cross-sectional side view of the valve assembly in a fourth position.
Figure 13:
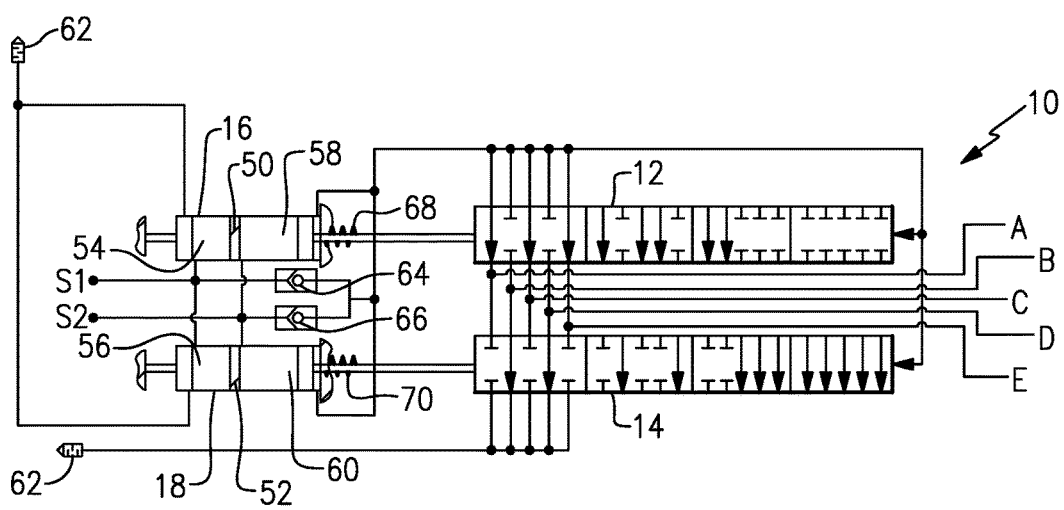
FIG. 13 illustrates a schematic diagram of the valve assembly in the fourth position.
Figure 14:
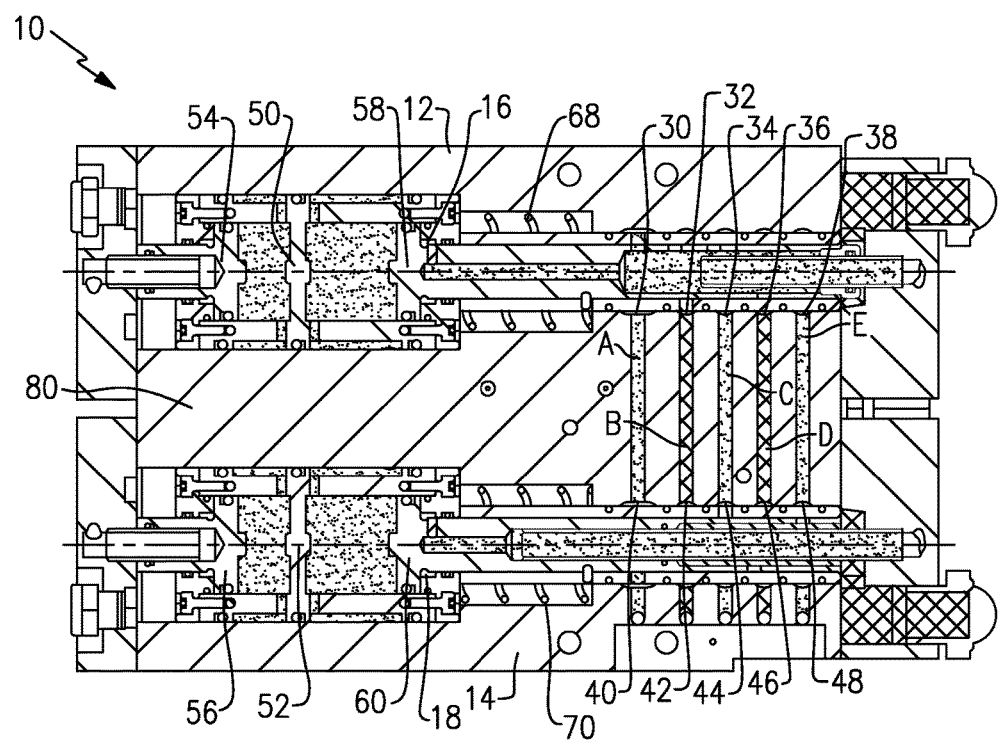
FIG. 14 illustrates a cross-sectional top view of the valve assembly in the fourth position taken along line IV-IV of FIG. 12.

FIGS. 12, 13 and 14 illustrate the valve assembly 10 in a fourth position. In the fourth position, the stroke is 30 mm. The flow of working air is shown with dotted lines, and the flow of exhausted air is shown as diagonal lines. In the fourth position, the pilot air S1 is provided to the compartments that contain the first piston 54 of the first pneumatic control cylinder 16 and the first piston 56 of the second pneumatic control cylinder 18, and the pilot air S2 is provided to the compartments that contain the second piston 58 of the first pneumatic control cylinder 16 and the second piston 60 of the second pneumatic control cylinder 18. In one example, the pressure of the pilot air S1 and S2 is 6 bar. The first pistons 54 and 56 are in the second position, and the second pistons 58 and 60 are in the second position. When the valve assembly 10 is the fourth position, air from the first spool valve 12 and the second spool valve 14 flows to the working ports A, C and E and exhausts through exhaust ports B and D through the silencer/muffler 62.

The valve assembly 10 includes a first resilient member mechanism 68 and a second first resilient member mechanism 70. When the valve assembly 10 is not operating, the first resilient member mechanism 68 and the second resilient member mechanism 70, along with the extra air remaining in the system, return the first piston 54 of the first pneumatic control cylinder 16 and the second piston 58 of the first pneumatic control cylinder 16, and the first piston 56 of the second pneumatic control cylinder 18 and the second piston 60 of the second pneumatic control cylinder 18, respectively, to the first position.

The valve assembly 10 includes the first spool valve 12 that directs fluid to a working object and the second spool valve 14 that directs fluid to the exhaust. The valve assembly 10 can direct the working air through different ports to allow for different working objects to be actuated.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A valve assembly comprising:
a first spool valve that directs fluid to a working object, wherein the first spool valve has 5 ports;
a second spool valve that directs fluid to an exhaust, wherein the second spool valve has 5 ports, and the valve assembly has only 4 positions;
a first check valve that controls a flow from a first supply of pilot air to the first spool valve; and
a second check valve that controls a flow from a second supply of pilot air to the first spool valve.

2. The valve assembly as recited in claim 1 wherein the 5 ports of the first spool valve are, respectively, a first spool valve first port, a first spool valve second port, a first spool valve third port, a first spool valve fourth port, and a first spool valve fifth port, and wherein the ports of the second spool valve are, respectively, a second spool valve first port, a second spool valve second port, a second spool valve third port, a second spool valve fourth port, and a second spool valve fifth port, wherein the first spool valve first port and the second spool valve first port define a port A, the first spool valve second port and the second spool valve second port define a port B, the first spool valve third port and the second spool valve third port define a port C, the first spool valve fourth port and the second spool valve fourth port define a port D, and the first spool valve fifth port and the second spool valve fifth port define a port E.

3. The valve assembly as recited in claim 2 wherein the first spool valve and the second spool valve are received in a body, and the port A, the port B, the port C, the port D and the port E are formed in the body between the first spool valve and the second spool valve.

4. The valve assembly as recited in claim 1 wherein the first spool valve and the second spool valve are actuated simultaneously by a first pneumatic control cylinder and a second pneumatic control cylinder, respectively, the first pneumatic control cylinder and the second pneumatic control cylinder are each configured to receive the first supply of pilot air and the second supply of pilot air.

5. The valve assembly as recited in claim 4 wherein the first pneumatic control cylinder includes a first spool valve wall, and a first spool valve first piston is located in a first spool valve first compartment on one side of the first spool valve wall and a first spool valve second piston is located in a first spool valve second compartment on an opposing side of the first spool valve wall, and the second pneumatic control cylinder includes a second spool valve wall, and a second spool valve first piston is located in a second spool valve first compartment on one side of the second spool valve wall and a second spool valve second piston is located in a second spool valve second compartment on an opposing side of the second spool valve wall.

6. The valve assembly as recited in claim 5 wherein, when the valve assembly is in a first position, the first supply of pilot air is not supplied to the first compartment of both the first spool valve and the second spool valve, and the second supply of pilot air is not supplied to the second compartment of both the first spool valve and the second spool valve.

7. The valve assembly as recited in claim 6 further comprising a port A, a port B, a port C, a port D, and a port E, wherein when the valve assembly is in the first position, air from the port A, the port B, the port C, the port D and the port E flows through the second spool valve and exhausts through a silencer/muffler.

8. The valve assembly as recited in claim 5 wherein, when the valve assembly is in a second position, the first supply of pilot air is supplied to the first compartment of both the first spool valve and the second spool valve, and the second supply of pilot air is not supplied to the second compartment of both the first spool valve and the second spool valve.

9. The valve assembly as recited in claim 8 further comprising a port A, a port B, a port C, a port D, and a port E, wherein when the valve assembly is in the second position, the first supply of pilot air flows through the first spool valve, the port A, and the port B, and air from the port C, the port D and the port E flows through the second spool valve and exhausts through a silencer/muffler.

10. The valve assembly as recited in claim 5 wherein, when the valve assembly is in a third position, the first supply of pilot air is not supplied to the first compartment of both the first spool valve and the second spool valve, and the second supply of pilot air is supplied to the second compartment of both the first spool valve and the second spool valve.

11. The valve assembly as recited in claim 10 further comprising a port A, a port B, a port C, a port D, and a port E, wherein when the valve assembly is in the third position, the second supply of pilot air flows through the first spool valve, the port A, the port C, and the port D, and air from the port B and the port E flows through the second spool valve and exhausts through a silencer/muffler.

12. The valve assembly as recited in claim 5 wherein, when the valve assembly is in a fourth position, the first supply of pilot air is supplied to the first compartment of both the first spool valve and the second spool valve, and the second supply of pilot air is supplied to the second compartment of both the first spool valve and the second spool valve.

13. The valve assembly as recited in claim 12 further comprising a port A, a port B, a port C, a port D, and a port E, wherein when the valve assembly is in the fourth position, the first supply of pilot air and the second supply of pilot air flow through the first spool valve, the port A, the port C, and the port E, and air from the port B and the port D flows through the second spool valve and exhausts through a silencer/muffler.

14. The valve assembly as recited in claim 4 wherein the first pneumatic control cylinder and the second pneumatic control cylinder include a first resilient member and a second resilient member, respectively, and when the first supply of pilot air and the second supply of pilot air are not being supplied, the first resilient member and the second resilient member return the first pneumatic control cylinder and the second pneumatic control cylinder to a first position.

* * * * *